United States Patent

Sugiyama et al.

[11] Patent Number: 5,847,867
[45] Date of Patent: Dec. 8, 1998

[54] CONFOCAL MICROSCOPE

[75] Inventors: Yumiko Sugiyama; Takeo Tanaami; Kenta Mikuriya; Katsumi Isozaki, all of Tokyo, Japan

[73] Assignee: Yokogawa Electric Corporation, Tokyo, Japan

[21] Appl. No.: 892,380

[22] Filed: Jul. 14, 1997

Related U.S. Application Data

[62] Division of Ser. No. 675,133, Jul. 3, 1996, Pat. No. 5,717,519.

[51] Int. Cl.$^6$ ..................................................... G02B 21/00
[52] U.S. Cl. ............................................ 359/368; 359/235
[58] Field of Search ....................................... 359/368, 379, 359/382–383, 385, 389, 234–236

[56] References Cited

U.S. PATENT DOCUMENTS 5,022,743  6/1991  Kino et al. .............................. 359/368
5,067,805  11/1991  Corle et al. .............................. 359/368
5,386,317  1/1995  Corle et al. .............................. 359/368
5,701,198  12/1997  Schoppe .................................. 359/368

*Primary Examiner*—James Phan
*Attorney, Agent, or Firm*—Moonray Kojima

[57] ABSTRACT

A confocal microscope comprising a confocal laser scanner which rotates a Nipkow disk at high speed together with microlenses wherein a beam splitter of a plate type is disposed between two integrated disks, in each of which a plurality of microlenses and minute openings are arranged with the same pattern in an array, and wherein the axis of incident light is tilted by a significant angle to the vertical incident axis of the microlenses, so that the light axis shift generated by the plate beam splitter is cancelled and the incident light to the relevant microlense is caused to be focused to the corresponding minute opening thereby improving light use efficiency.

6 Claims, 11 Drawing Sheets

Aperture of Objective Lens

CONFOCAL MICROSCOPE

This is a division of application Ser. No. 08/675,133, filed Jul. 3, 1996, now U.S. Pat. No. 5,717,519.

BACKGROUND OF THE INVENTION

1. Field of Invention

This invention relates to confocal microscopes incorporating a confocal laser scanner which rotates a Nipkow disk at high speed together with a plurality of microlenses; and more particularly, to improvements of such confocal microscopes resulting in increased light use efficiency.

2. Description of the Related Art

Confocal microscopes are well known, as are confocal light scanners using Nipkow disks which are rotated at high speeds which light scanners are used in such microscopes. However, the conventional confocal microscopes using such confocal light scanners have problems involving inefficient use of light.

FIG. 1 shows an example of a conventional confocal light scanner wherein a laser 1 transmits a light through microlenses (not shown) arranged in microlense disk 2 and cube shaped dichroic mirror 4, respectively, and the light is focused on pin holes (minute openings, not shown) formed in an array in Nipkow disk 3. The microlense disk may comprise the collector disk, for example, described in Japan Patent Appl. Ser. No. 1992/15,411 (Published 1993/60,980). As depicted in FIG. 2, collector disk 20 is formed of glass plate 21 on which a number of Fresnel lenses 22 are formed. The Fresnel lenses are so formed that the focusing position of each shifts radially, in turn, from one image plane to another image plane.

Dichroic mirror 4 (see FIG. 1) is disposed in the space between microlense disk 2 and Nipkow disk 3 with a supporting mechanism not shown in FIG. 1. Light focused on the pin holes of Nipkow disk 3 is transmitted through objective lense 6 and is irradiated onto sample 7. Fluorescence emitted from sample 7 is focused onto the pin holes of disk 3 through objective lense 6. Thus, a real image of sample 7 is obtained at the pin holes. This image is reflected by dichroic mirror 4 and is formed on the light receiving plane of camera 9 through relay lense 8.

Nipkow disk 3 is coupled to microlense disk 2 and both disks are rotated concurrently by motor 5. In such a configuration, a two dimensional image of the surface of sample 7 can be obtained on the light receiving plane of camera 9 by scanning the surface of sample 7 with a light beam by rotating microlense disk 2 and Nipkow disk 3.

In the foregoing device, if a laser beam is made to be incident vertically (i.e. at a 90° angle) to the microlense disk 2, the optical axis is not deflected in cube dichroic mirror 4, and hence, a light source image is formed on Nipkow disk 3 having the same patterns as that of microlense disk 2. This makes alignment of the microlenses and pin holes easy.

However, cube dichroic mirror 4 has a problem in that since it is formed of glass both in the front and back of the film and the refractive indices are the same, it is difficult to obtain a sharp characteristic for separating fluorescence from exciting light, as compared, for example, with a plate dichroic mirror which can provide a large difference between refractive indices on both sides because one side can be of air.

In order to improve fluorescence measuring performance in fluorescent confocal light scanners, the use of a plate dichroic mirror solves the foregoing problem. However, if a plate dichroic mirror is disposed between disks 2 and 3, the optical axis is shifted by an amount "d" as shown in FIG. 3. For this reason, in this conventional device, the pin hole positions on Nipkow disk 3 can not be aligned with the microlense disk 2. This problem is not limited to the fluorescence type of microscope, but also occurs in microscopes using reflection beam splitters.

SUMMARY OF THE INVENTION

Accordingly, it is an object of the invention to overcome the foregoing and other deficiencies and disadvantages of the prior art.

Another object is to provide a confocal microscope which has improved light use efficiency.

The foregoing and other objects are attained in the invention which encompasses a confocal microscope which employees a confocal light scanner and a plate beam splitter and wherein a converging laser beam is made to be incident on both the microlense and pinholes The invention comprises a confocal light scanner provided with two integrated disks, in one of which a plurality of microlenses are arranged while in the other a plurality of minute openings are arranged, both being in an array of the same pattern, a rotation means for rotating the two disks, a beam splitter disposed between the two disks, and an objective lense disposed between the two disks and a sample, wherein a plate beam splitter is used as the beam splitter; the optical axis of light incident to the microlenses is tilted to the optical axis of a light vertical to the microlenses, and light incident to the microlenses is focused on the minute openings whose positions correspond to the relevant microlenses.

In the invention, a beam splitter, such as a plate beam splitter is disposed between the two disks, and the tilting of the optical axis cancels the shift of the optical axis caused by the plate beam splitter and causes the incident light to the microlense to be focused onto the corresponding minute openings.

DESCRIPTION OF THE PREFERRED EMBODIMENTS

Figure 1:
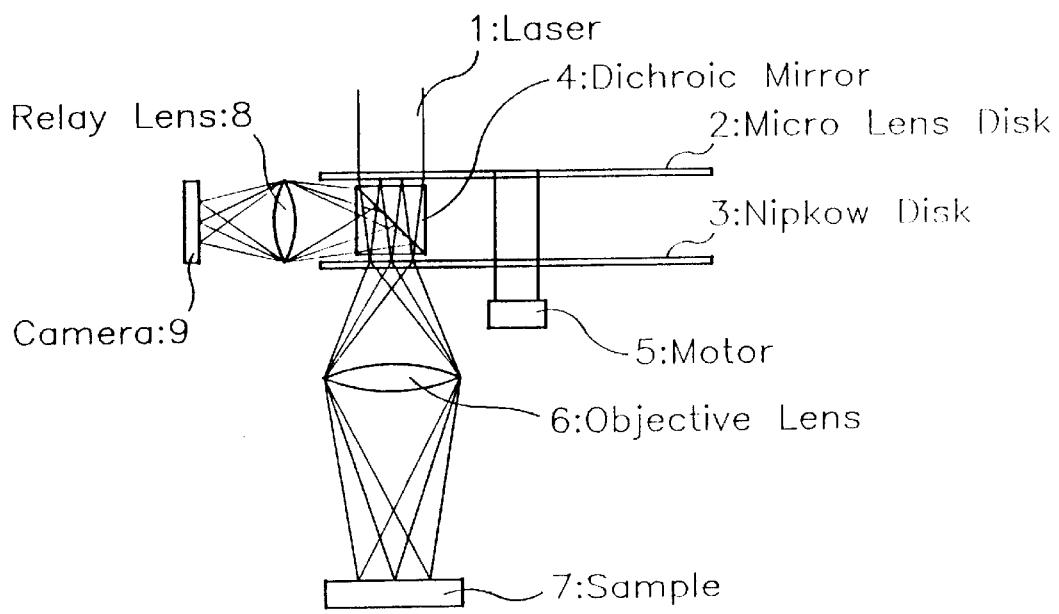
FIG. 1 is a diagram depicting a conventional confocal microscope.
Figure 2:
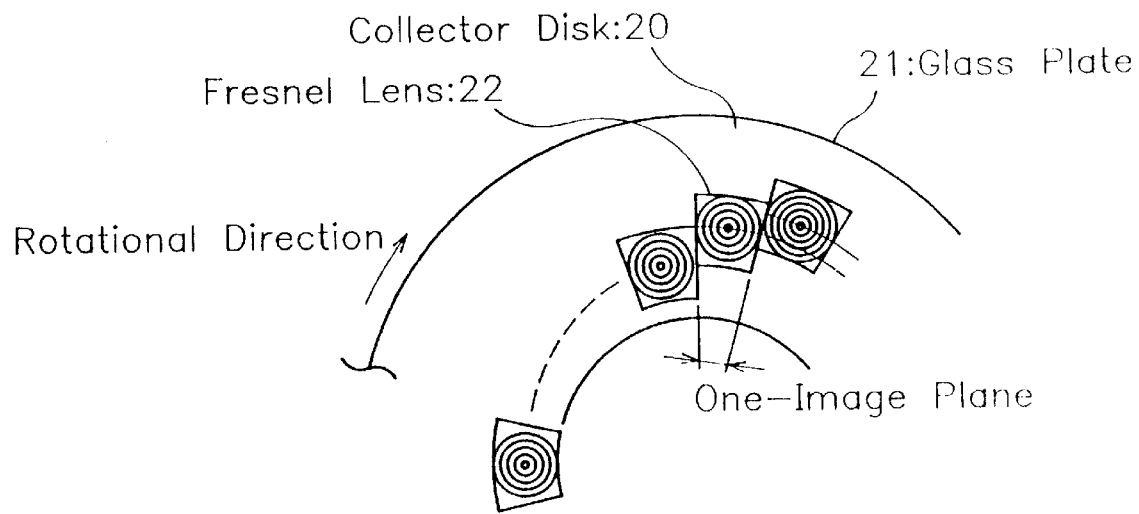
FIG. 2 is a diagram depicting a configuration of conventional microlense.
Figure 3:
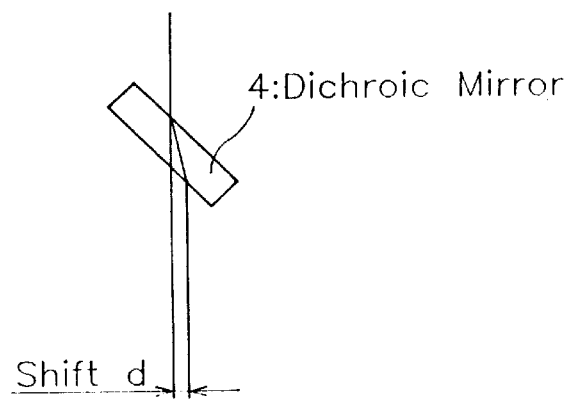
FIG. 3 is a diagram depicting shift of optical axis in a dichroic mirror.

In the following description, the same symbols and numerals used in FIG. 1 represent the same parts in the remaining figures, and description of such parts is omitted hereafter for sake of brevity.

Figure 4:
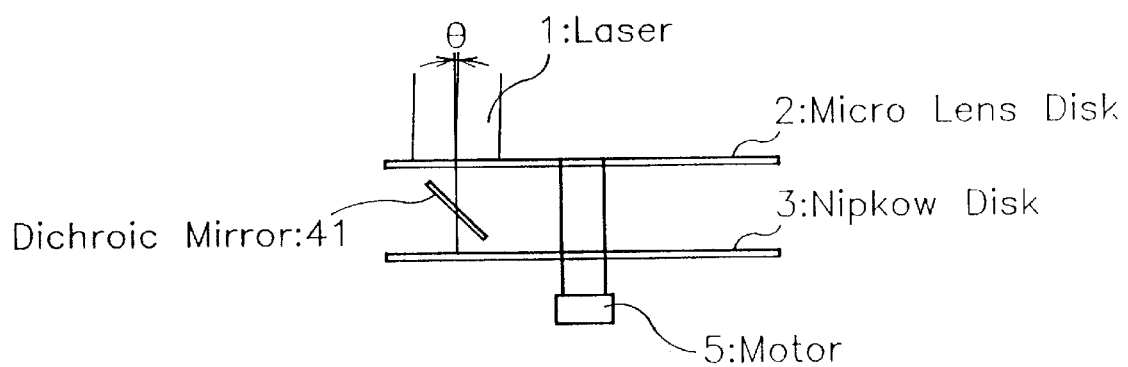
FIG. 4 is a diagram depicting a first illustrative embodiment of the invention as embodied in a confocal light scanner.
Figure 5:
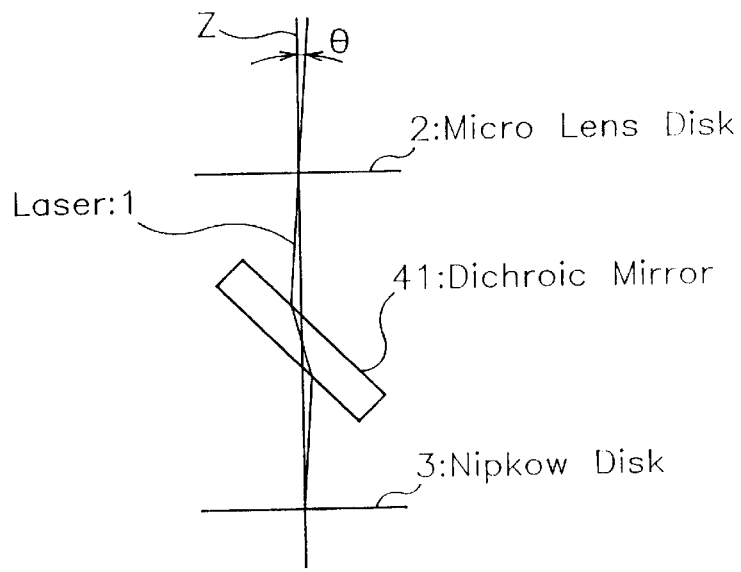
FIG. 5 is an enlarged view depicting a dichroic mirror.

In FIGS. 4 and 5, a plate dichroic mirror 41 is positioned betweeen microlense disk 2 and Nipkow disk 3. Laser 1 is positioned so that the light produced thereby is made to be incident on microlense disk 2 with an optical axis tilted by angle θ from the vertical incident axis Z of microlenses in disk 2. The tilted angle θ is determined in relation to the distance between microlense disk 2 and Nipkow disk 3 and the thickness of dichroic mirror 41. The laser light diaphragmed by the microlenses is shifted by its optical axis by dichroic mirror 41, then transmitted through the pin holes of Nipkow disk 3 and adjusted to be vertical under the microlense disk in the same pattern, and then scanned over a sample by being rotated by motor 5. Since the other operations are similar to FIG. 1, description thereof is omitted hereat. The optical axis shift due to action of the plate dichroic mirror 41 can be corrected by having the laser light to be incident to microlense disk 2 with the laser light being tilted from the vertical.

Figure 6:
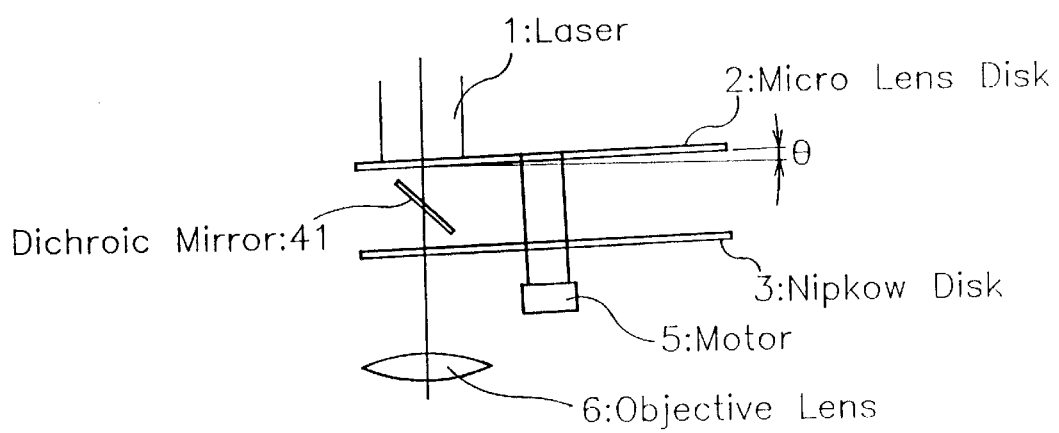
FIG. 6 is a diagram depicting a second illustrative embodiment of the invention as embodied in a confocal light scanner.

FIG. 6 shows the optical axis of the laser light to be tilted from the vertical incident axis to the microlenses. However, in FIG. 6, a unit in which microlense disk 2, Nipkow disk 3, dichroic mirror 41, and motor 5 are integrated, is tilted by angle θ from laser 1 with the optical axis of original laser 1 aligned with the vertical incident optical axis of the objective lense 6. In such an embodiment, the same effect is obtainable as with the first embodiment. In addition, the invention can be used with fluorescent confocal light scanners as well as with reflection confocal light scanners which use beam splitters, or half-mirrors, or polarized beam splitters, or the like, instead of dichroic mirrors.

As discussed, the invention can cancel the shift of the laser light optical axis due to the plate dichroic mirror 41 by tilting the optical axis by a significant angle against disk 2 and facilitate the use of the plate dichroic mirror having a characteristic of good fluroscent light separation from the exciting light.

Increase of light use efficiency can also be accomplished by widening the field of view of the confocal microscope, such as shown in FIG. 1. However, in this microscope, microlenses of long focal lengths and a smaller number of apertures (called "NA") can be used only to widen the field of view. However, such a configuration has the following problems. First, general purpose microlenses of short focal lengths and large NA's cannot be used, which leads to higher prices. Second, it is difficult to construct a measuring system having a wide field of view and large NA's. For example, if a wide area, such as the surface of an integrated circuit, is to be viewed at low magnification, an ordinary low magnification objective lense cannot provide a suitable slice image because of the small NA's, while in order to obtain a wide field of view and large NA's, small pin holes and large microlenses must be used, which is difficult as discussed above. Third, although dichroic mirrors, used in commercially available fluorescent microscopes, transmit longer wavelengths and reflect shorter wavelengths, the foregoing confocal microscope can only transmit shorter wavelengths and reflect longer wavelengths. This prevents the use of commercially available dichroic mirrors.

In order to revolve the foregoing problems, the following embodiment has the optical axis disposed on the peripheral side and light is returned to the pin holes with another mirror. In this case, the length of light path is extended by a relay lense. This enables use of a microlense of a short focal length and use of a commercially available dichroic mirror as the beam splitter.

Figure 7:
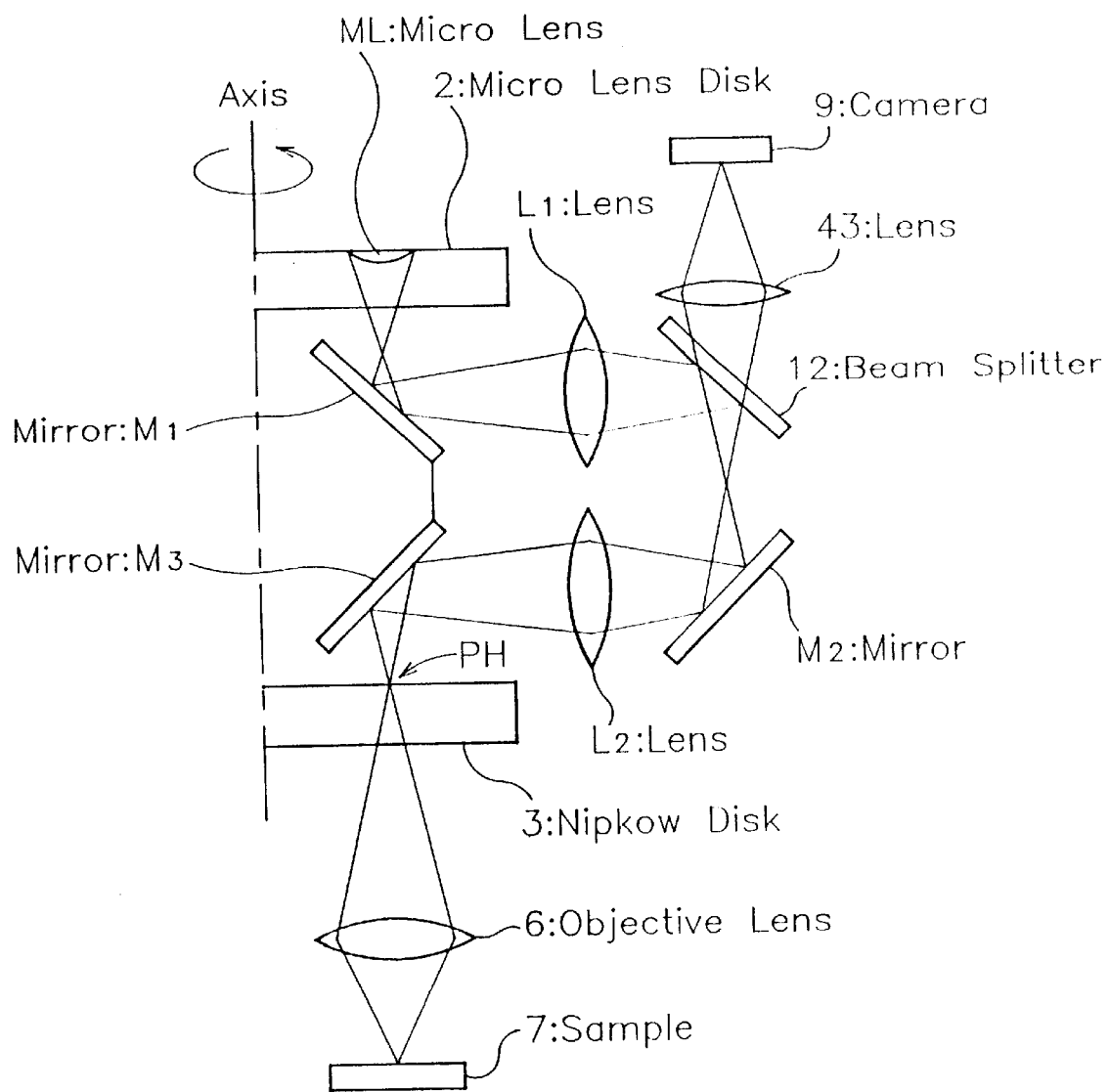
FIGS. 7, 8, 9 and 10 are diagrams depicting, respectively, third, fourth, fifth and sixth illustrative embodiments of the invention as embodied in a confocal light scanner.

FIG. 7 shows the first ($M_1$), second ($M_2$), and third ($M_3$) reflection mirrors, respectively, and first ($L_1$) and second ($L_2$) relay lenses. Light transmitted through microlense ML in converging disk 2 is reflected with the first mirror $M_1$ diaphragmed with first lens $L_1$ and is made incident on beam splitter 12 (a dichroic mirror in this case). The incident light has shorter wavelengths, is reflected with dichroic mirror 12, then reflected with mirror $M_2$, diaphragmed with second lense $L_2$, reflected with third mirror $M_3$ and focused on pin hole PH in disk 3.

The light focused on pin hole PH is transmitted through objective lense 6 and irradiates sample 7 is a way similar to that in the art. The return light from the sample is transmitted through objective lense 6 and forms an image of the sample on pin hole PH. The real image is reflected with third mirror $M_3$, diaphragmed with second lense $L_2$, reflected with second mirror $M_2$, transmitted through beam splitter 12, and then diaphragmed with converging lense 43, and then focused on the light receiving plane of camera 9.

In this case, mirrors $M_1$, $M_2$, $M_3$, lenses $L_1$, $L_2$, beam splitter 12, converging lense 43 and camera 9 are arranged in fixed positions. In the embodiment, the lengths of each light path from each microlense ML to its corresponding pin hole PH, are the same. Since the light path is extended using relay lenses $L_1$ and $L_2$ so that the optical axis is introduced to the peripheral side of disks 14, 15 with reflection mirror $M_1$, and is returned to pin hole PH with second and third reflection mirrors $M_2$ and $M_3$, microlenses ML of a short focal length can be used. In addition, since beam splitter 12 reflects the incident light and transmits the return light, a dichroic mirror of the type that reflects the incident light and transmits the return light can be used instead of beam splitter 12. Furthermore, a microlense of a short focal length for optical fibers available on the market can be used as the microlense ML. The adoption of such a construction makes the use of the microlenses of a short focal length and large NA's possible and enables the NA's of microlenses and the NA incident to pin holes to be designed separately.

Figure 8:
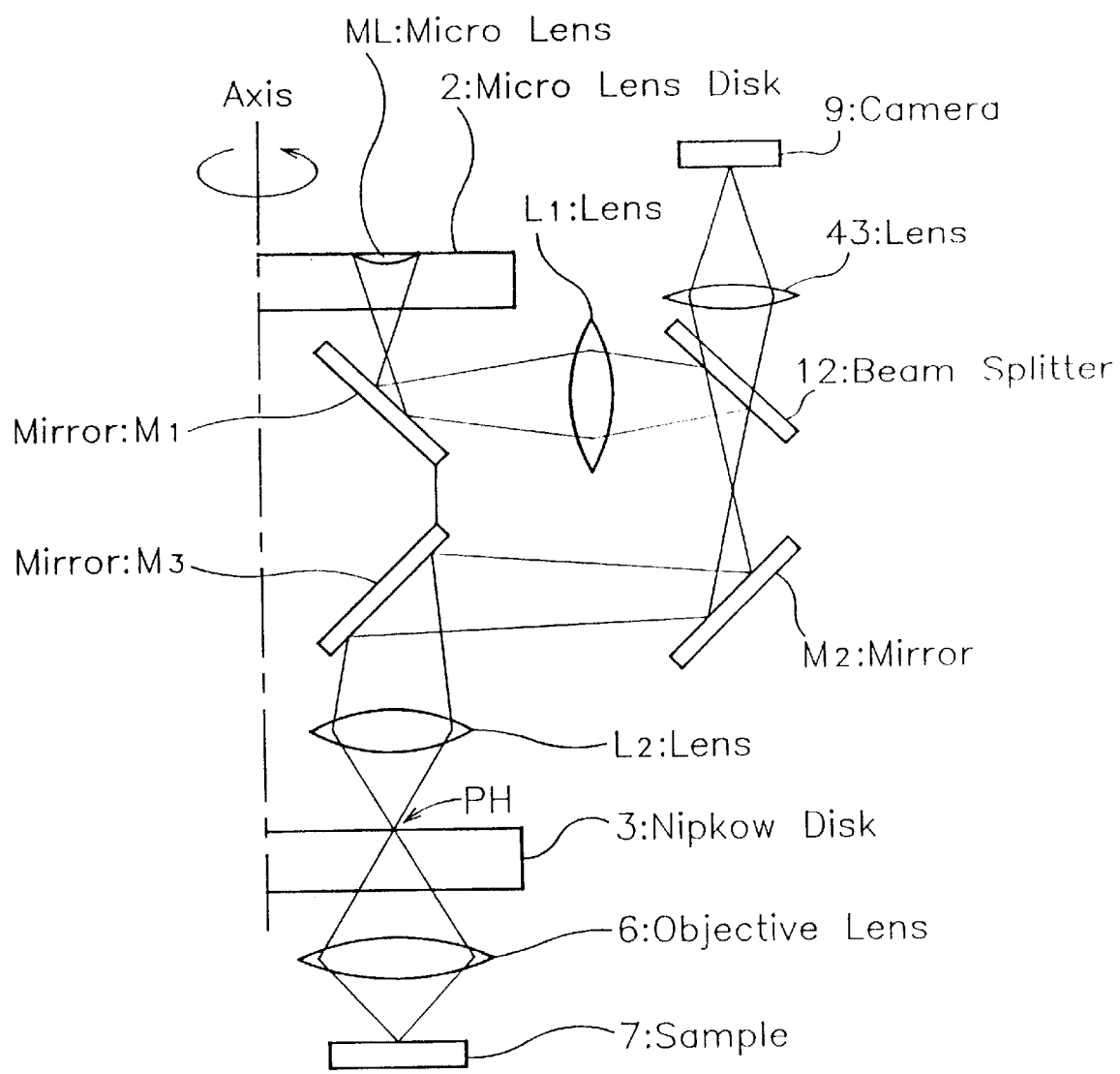

FIG. 8 differs from FIG. 7 in that a second lense $L_2$ is located between third mirror $M_3$ and pin hole disk 3 so that the system can cope with a large NA objective lense.

For example, the number of apertures of the objective lense is normally 0.2 for a magnification of 10 in a usual confocal microscope. Thus, the NA's at the pin hole is 0.2/10 0.02. In this case, the pin hole diameter is 30 μm. On the other hand, the case of large NA's, i.e. a magnification of 10 and an objective lense NA of 0.9, produces the NA's at the pin hole of 0.09 and the pin hole diameter of 7 μm.

Using the embodiment of FIG. 8, small pin holes and large NA microlenses can be used together with large NA objective lenses.

Figure 9:
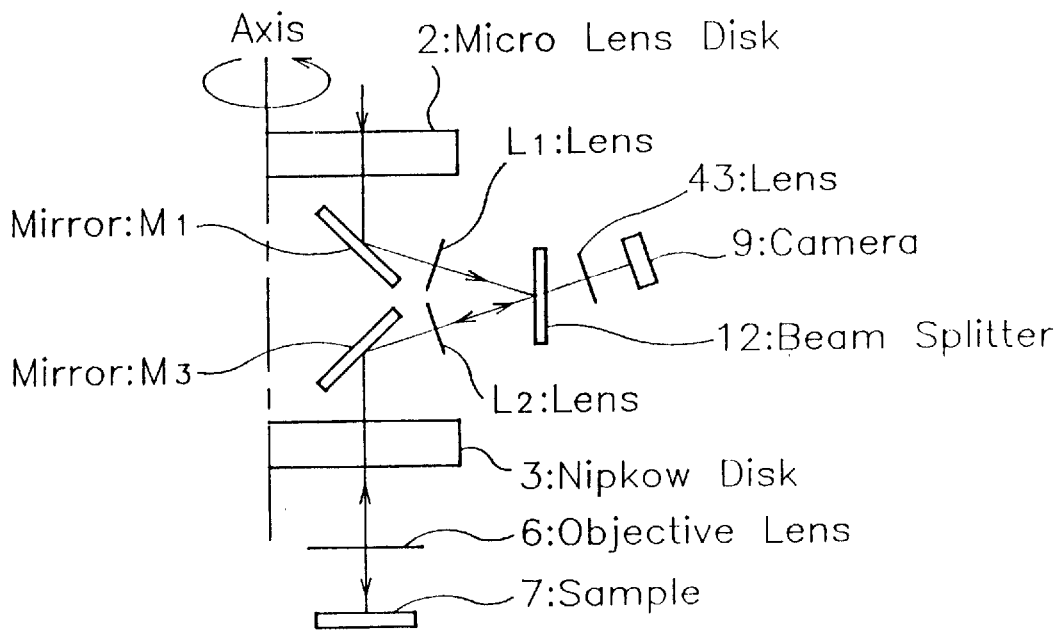

FIG. 9 differs from FIG. 7 in that there are only two mirrors $M_1$ and $M_3$ and second mirror $M_2$ is omitted.

Figure 10:
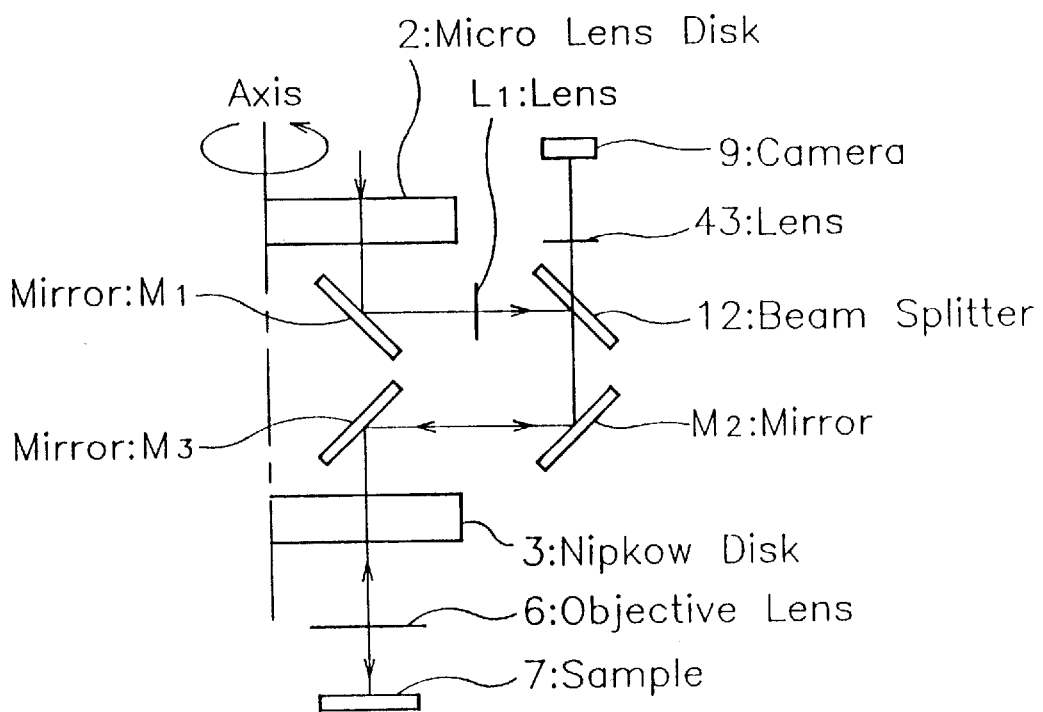

FIG. 10 differs from FIG. 7 in that lense $L_2$ and mirror $M_2$ are omitted.

The embodiments of FIGS. 8, 9, and 10 operate in a manner similar to the embodiment of FIG. 7.

Moreover, the placement of the mirrors and lenses between the microlenses and the pin holes enables the NA's of the microlenses on the light source side and the NA's on the pin hole side to be designed independently. Hence, the small pin holes and the microlenses of a short focal length and with large NA's can be used thereby facilitating the implementation of a measuring system having a wide field of view and large NA's. Also, since the light path from the microlenses to the pin holes is extended using relay lenses, a reflection excitation dichroic mirror can be used instead of a beam splitter and hence a confocal microscope having a suitable wave length characteristic and of low cost can be realized. In addition by tilting mirrors $M_1$ and $M_3$, a plate dichroic mirror can be used.

Figure 11:
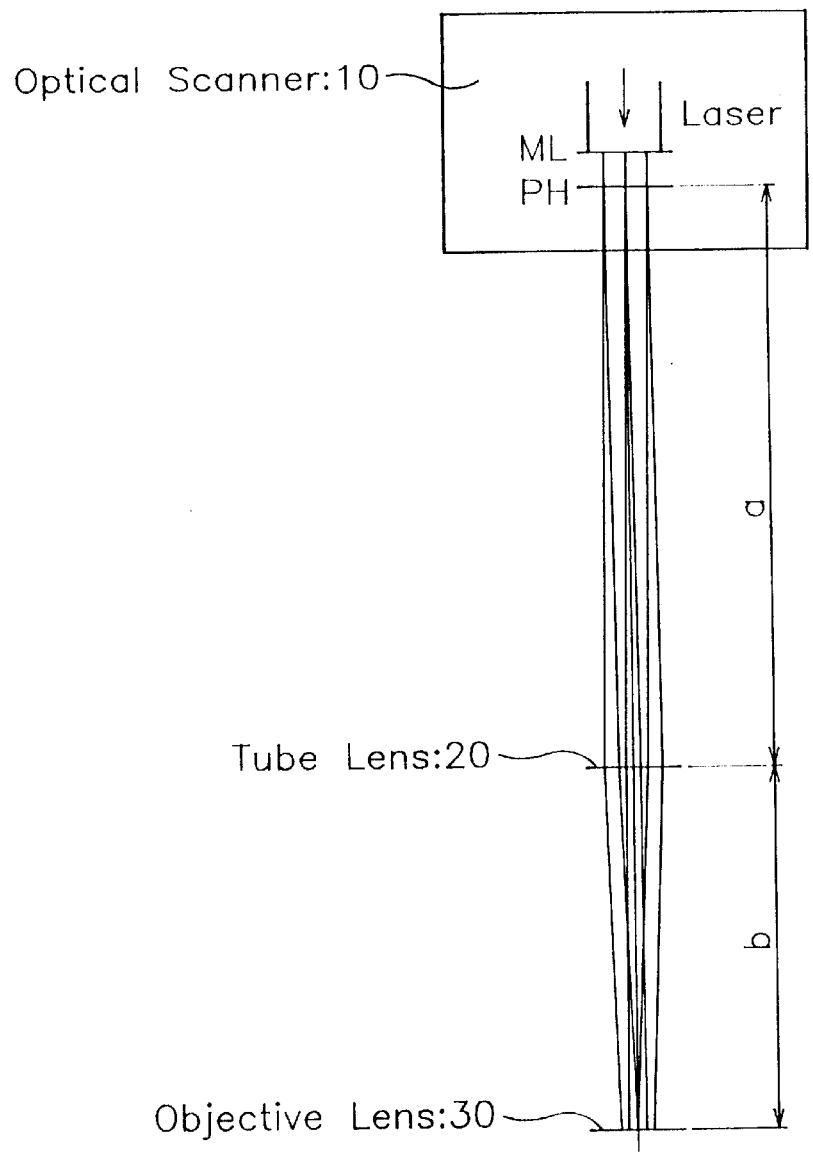
FIG. 11 is a diagram depicting another exemplary conventional confocal microscope.

Another embodiment for improving light use efficiency at the periphery of the field of view and for improving resolution, especially in a microscope comprising an infinite optical system is shown in FIG. 11, wherein an optical scanner 10 is attached to such a microscope and comprises a tube lense 20 and an objective lense 30. The laser light converged by microlense ML, in the optical scanner becomes a point source at the pin hole (i.e. the point sources from three pin holes are shown in the drawing) and the light beams from these points sources become parallel with each other via tube lense 20 and are made incident to objective lense 30.

Figure 12:
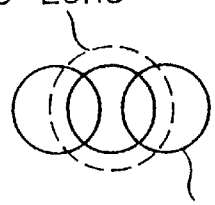
FIG. 12 is a diagram depicting the relationship between the aperture of the objective lense and the laser light incident position shown in FIG. 11.

In the foregoing, since a microscope comprising an infinite optical system is configured based on the principle of Koehler illumination to illuminate the sample in the highest brightness, the interval between "b" between tube lense 20 and objective lense 30 is not equal to the focal length "a" of tube lense 20. Accordingly, if a confocal optical scanner with pin holes is attached to such a microscope having an infinite optical system, the light from the outside of the pin hole array is made incident to positions shifted from the center of the aperture of the objective lense 30 as shown in FIG. 12. Such a configuration has the following problems. First, the diameter of the aperture is small depending on the kind of objective lense 30. This reduces the amount of light from outside the pin holes. Thus, amount of illumination declines at the periphery ( i.e. illumination non-uniformity occurs). Second, since the aperture of the objective lense can not be filled with light from outside of the pin holes, the number of apertures of objective lense 30 cannot be fully utilized. Hence resolution becomes lower at the outside areas.

Figure 13:
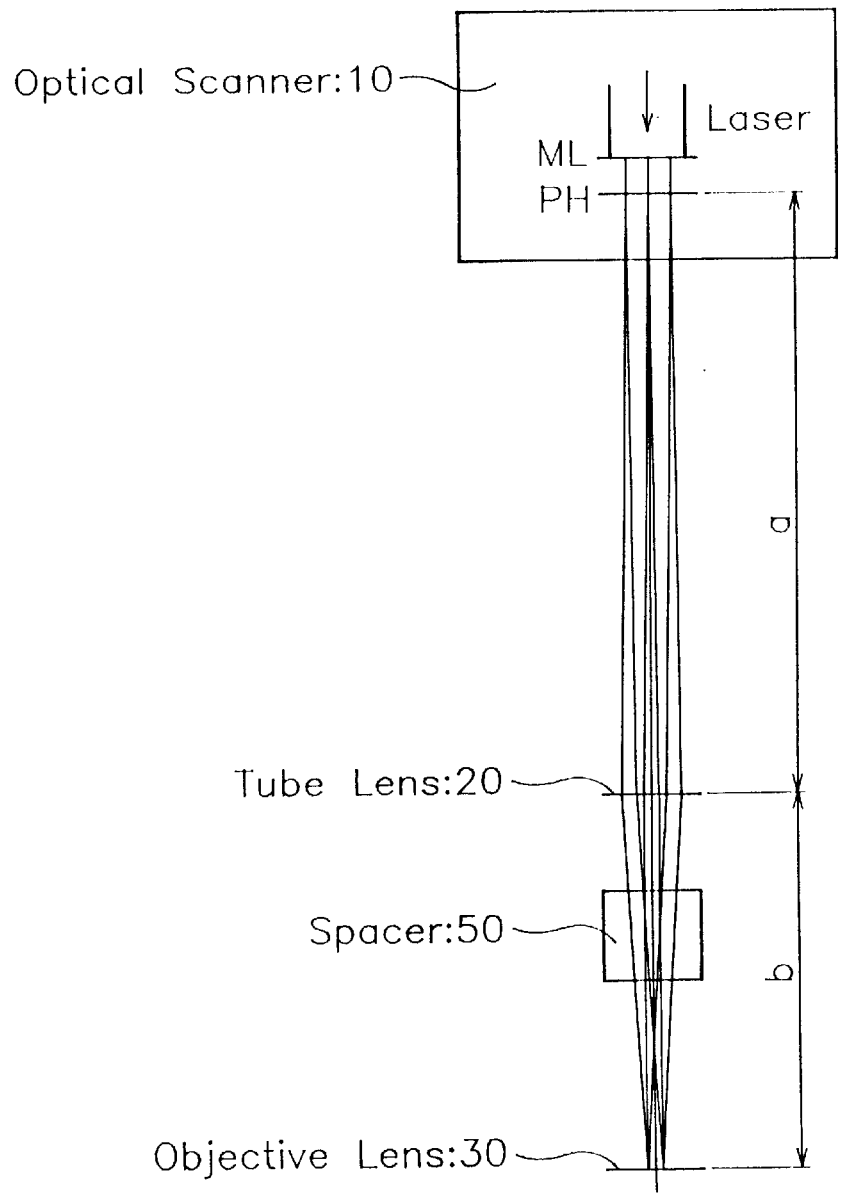
FIG. 13 is a diagram depicting a first illustrative embodiment; of a confocal microscope of the invention.
Figure 14:
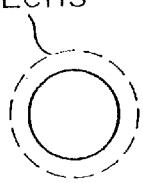
FIG. 14 is a diagram depicting the relationship between the aperture of the objective lense and the laser light incident position in FIG. 13.

The foregoing problems are solved by the embodiment of FIG. 13 which differs from FIG. 11 in that spacer 50 is disposed between tube lense 20 and objective lense 30 so that the distance "b" between tube lense 20 and objective lense 30 is equal to the focal length "a" of tube lense 20. Spacer 20 is a hollow ring engaged with a cylinder, not shown, to which tube lense 20 and objective lense 30 are mounted, and acts to extend the cylinder. If such spacer 50 is mounted to equalize the distance "b" between tube lense 20 and objective lense 30 to the focal length "a" of tube lense 20, the laser light from all pin holes PH is made incident to the center of the aperture of objective lense 20 as a result, as shown in FIG. 14.

In addition, advantageously, the optical system can be operated without microlenses ML.

In the above embodiment, since the laser light from the pin holes at the outside areas can be made incident at the center of the aperture of the objective lense, the following effects are attained. First, light loss is eliminated because the light quantity from the pin holes from the outer part of the image area is not reduced by the diameter of the aperture of the objective lense. Thus, the light use efficiency is increased and no illumination non-uniformity is generated. Second, both pin holes at the outer part and at the center part of the image area can equally and effectively use the aperture of the objective lense. The number of apertures is not decreased. Lowering of the resolution for the outer part does not occur.

Figure 15:
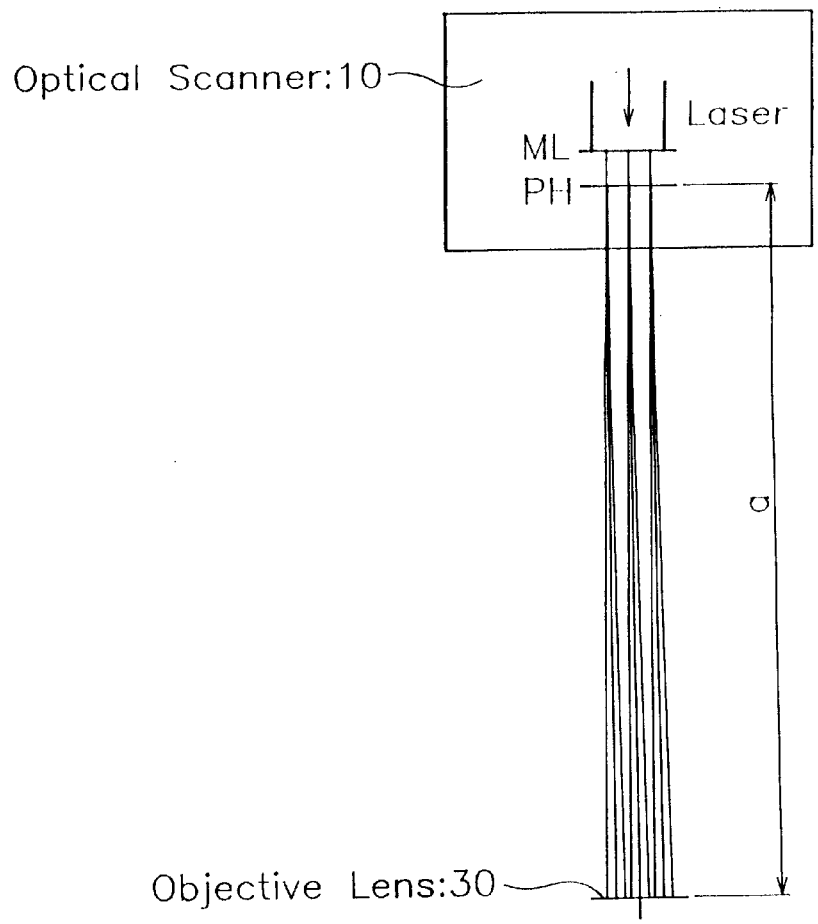
FIG. 15 is a diagram depicting a conventional light scanner mounted on a microscope having a finite optical system.
Figure 16:
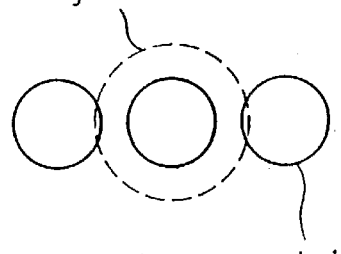
FIG. 16 is a diagram depicting the relationship between the aperture of the objective lense and the laser light incident position in FIG. 15.

The above embodiments are for microscopes of an infinite optical system. For microscopes of the finite optical system, the embodiment of FIG. 15 may be used. In FIG. 15, the distance of pin hole PH and objective lense 30 is equal to the image focal length "a" as shown in FIG. 15. For this reason, as shown in FIG. 16, all light beams from pin holes PH are made incident on objective lense 30 with the optical axis thereof being at 0 degrees and in parallel with each other, and the light from the outer part is made incident to the shifted part from the center of aperture of objective lense 30. If a lense having the same focal length as the image focal of the objective lense is provided between the minute openings and the objective lens to enable the light from all minute openings to be incident to the center of the aperture of the objective lense, the loss of light at the outer part can be eliminated and light use efficiency can be improved. Also, the resolution at the outer part is raised.

Figure 17:
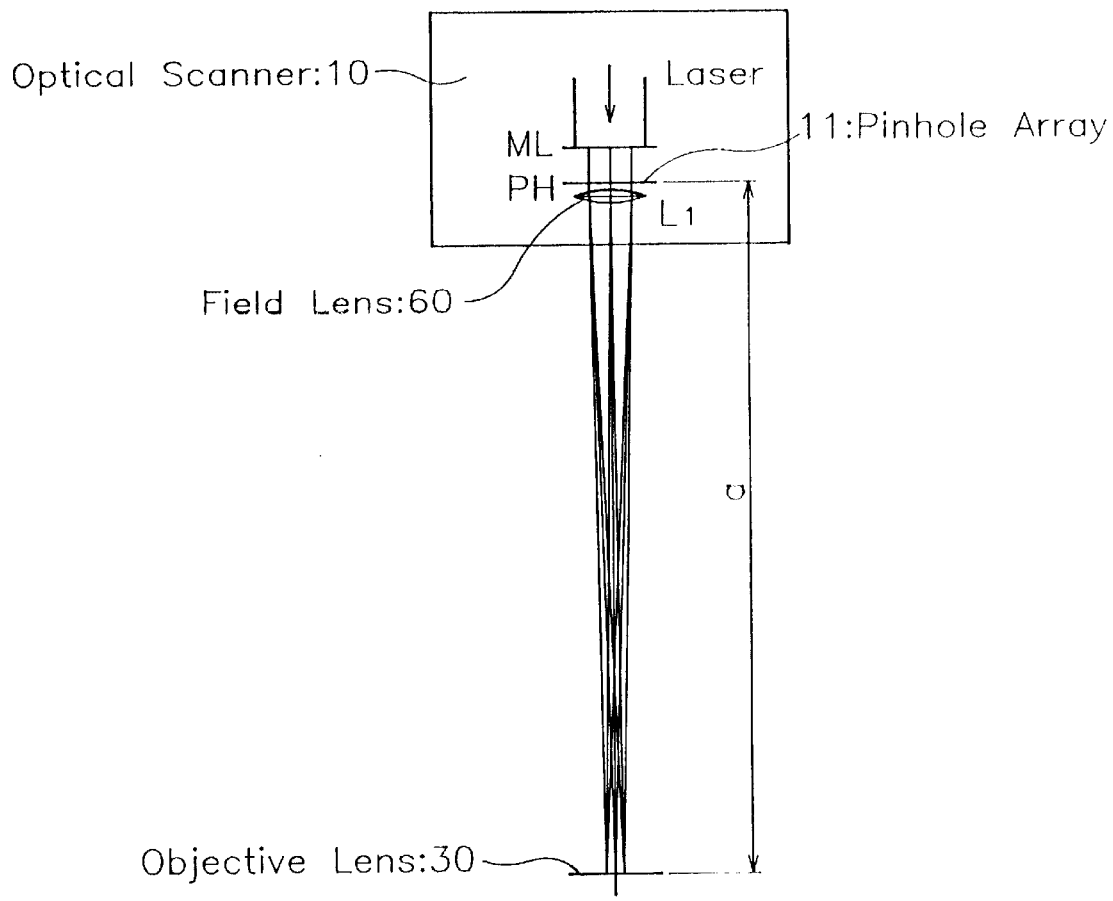
FIG. 17 is a diagram depicting a second illustrative embodiment of a confocal microscope of the invention.

FIG. 17 shows an embodiment which differs from FIG. 15 in that field lense 60 is provided immediately under the pin hole array. Field lense 60 has the same focal length as the image focal length "a" of the objective lense 30 in a finite optical system microscope and is placed close to pin hole array 11.

Figure 18:
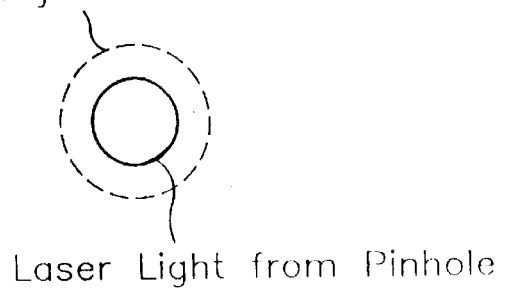
FIG. 18 is a diagram depicting the relationship between the aperture of the objective lense and the laser light incident position in FIG. 17.

The laser light is diaphragmed by microlense ML into pin hole PH and the optical axis of the laser light that passes through pin hole PH is deflected toward the center of the objective lense 30 aperture by field lens 60 place immediately under pin hole PH. Accordingly, the laser light from all pin holes PH is made incident to the center of the aperture of objective lense 30, as shown in FIG. 18. The optical axis of the return light from the sample(not shown) is deflected by field lense 60 so that the optical axis is made incident at 0 degree to pin hole PH. This increases the light use efficiency. In this case, if field lense 60 is considerably distance from the pin hole surface, an aberration occurs. However, generally, since the focal length "a" can be designed to be about 200 mm, and the distance between pin hole PH and field lense 60 is designed to be about 10 mm, there is virtually no problem from aberration.

Figure 19:
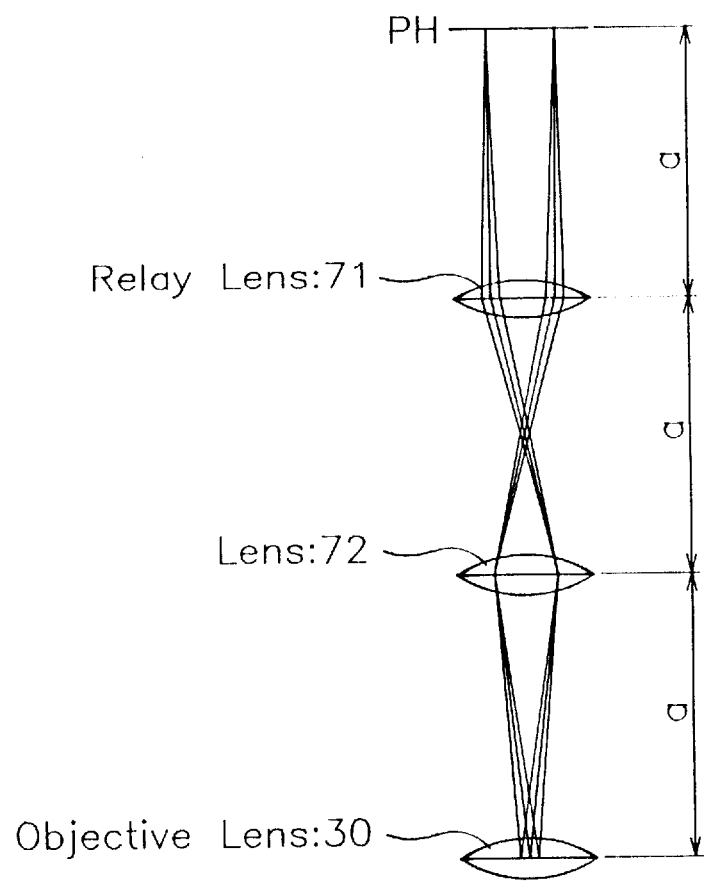
FIG. 19 is a diagram depicting a third illustrative embodiment of a confocal microscope of the invention.

FIG. 19 shows a relay lense 71 and a lense 72 disposed between pin hole PH and objective lense 30. Relay lense 71 forms an image plane of pin holes PH in the position of the image focal length "a" of objective lense 30 and is placed between pin holes pH and objective lense 30. Lense 72 has the same focal length as the image focal length "a" of objective lense 30 and is placed in the position of the image plane of pin hole PH obtained by relay lense 71. This configuration enables all of the light from the pin holes to be made incident to the center of the aperture of objective lense 30.

This invention is not limited to the foregoing embodiments, and can be appropriately changed, modified or extended. For example, microlense ML may be omitted. Also, the shape of the minute openings is not limited to a circle, but other suitable shapes may be used.

In the foregoing description, the word "diaphragmed" or the like was used in connection with light being passed through a lense or microlense. The word "focused" can also be used in its place.

The foregoing description is illustrative of the principles of the invention. Numerous extensions and modifications thereof would be apparent to the worker skilled in the art. All such modifications and extensions are to be considered to be within the spirit and scope of the invention.

What is claimed is:

1. In a confocal microscope comprising:

a confocal light scanner having at least one minute opening portion with at least one opening therein and attached to a microscope;

wherein laser beams from said at least one opening are irradiated to a sample through at least one objective lens; and, wherein return beams from said sample are returned to said at least one opening through said at least one objective lens so that an image on a sample surface is observed by scanning the sample surface with light by rotating said at least one minute opening portion, the improvement comprising:

optical axis centering means disposed between said objective lens and said at least one minute opening portion for centering the optical axis of the laser light beam passed through the at least one opening to the center of said objective lens, whereby light use efficiency is increased without causing abberation at the outer periphery; and wherein said microscope is an infinite optical system, wherein a tube lens of a set focal length is positioned between said at least one minute opening portion and an objective lens so that the return beams from said sample are returned through said objective lens and said tube lens, and wherein said optical axis centering means is disposed between said tube lens and said objective lens and said optical axis centering means controls the distance therebeween so as to be equal to the focal length of said tube lens.

2. The microscope of claim 1, wherein said optical axis centering means comprises means for adjusting the focal length of said tube lens to be equal to the image focal length of said objective lens and disposed between said at least one minute opening portion and said objective lens.

3. The microscope of claim 2, wherein said confocal light scanner comprises a plurality of microlenses.

4. The microscope of claim 1, wherein said tube lens and said optical axis centering means are disposed close to said minute opening portion and are arranged so that all of the light beams from said minute opening portion are made to be incident on a center of an aperture of said objective lens.

5. The microscope of claim 4, wherein said confocal light scanner comprises a plurality of microlenses.

6. The microscope of claim 1, wherein said confocal light scanner comprises a plurality of microlenses.

* * * * *